Oct. 12, 1926.

R. J. BELER

WATER HEATER

Filed August 19, 1921

1,602,389

INVENTOR.

Robert J. Beler
by W. J. Doolittle
Attorney.

Patented Oct. 12, 1926.

1,602,389

UNITED STATES PATENT OFFICE.

ROBERT J. BELER, OF PITTSBURGH, PENNSYLVANIA.

WATER HEATER.

Application filed August 19, 1921. Serial No. 493,571.

My invention is for a water heater for supplying hot water for domestic and other uses, and relates especially to that type of water heater in which a tank of water is kept heated, and from which the hot water to be used is drawn.

There are two types of water heaters in common use at this time. One type is known as an "instantaneous" heater, the water being heated as it is used by burners disposed beneath coils of pipe, the burners being lighted from a pilot light and supplied with fuel only when the water is being used, an automatic valve being provided for controlling the flow of fuel from the flow of water. In the other type of heater, a relatively large tank is provided, and a heating coil is disposed at one side of the tank and has its upper end connected through a pipe with the top of the tank and its lower end connected with the bottom of the tank. A small burner is located beneath the coil, and the water is slowly heated. The water in the tank is kept heated by circulating through the coil, and the quantity of hot water available is limited by the capacity of the tank. The tank is generally exposed, so that some of the heat is lost. In such heaters, the water must be heated slowly, because if the burner heated with sufficient rapidity, the water would become too hot and the burner would have to be turned down or out. Considerable manual manipulation and adjustment is therefore often necessary with heaters of this kind, especially in domestic installations where the amount of hot water used varies considerably at different times.

According to the present invention, I provide a tank of a suitable capacity. Beneath the tank are one or more heating coils which are supplied with water at the bottom of the tank, and which deliver heated water into the tank at a point above the point where the water flows into the coils. The cold water is supplied to the tank at a point near the bottom thereof and preferably below the point where the coils discharge heated water into the tank. A burner, adapted to rapidly heat the water, is disposed beneath the coils, and a pilot light is positioned near the burners. A thermostat located in the lower part of the tank controls the flow of fuel to the burners. Hot water is withdrawn from the top of the tank. With this arrangement, the pilot light is normally the only burner which is using fuel. When the temperature of the water in the tank falls below a predetermined minimum, the thermostat supplies fuel to the main burner and the temperature of the water is rapidly raised, although it is not contemplated that the water be heated to the desired temperature at the rate at which it is consumed.

The primary object of my invention is to provide a water heater of the type using a hot water tank or reservoir in which the water may be heated with great rapidity until the desired temperature is reached, after which the water will normally be automatically maintained at the desired temperature. Further objects are to provide an improved construction arranged to give the most efficient circulation of the water in the tank and coils and in which more of the heat of combustion will be utilized and in which there will be less loss from radiation.

My invention may be more fully described in connection with the accompanying drawings, in which.

Figure 1:
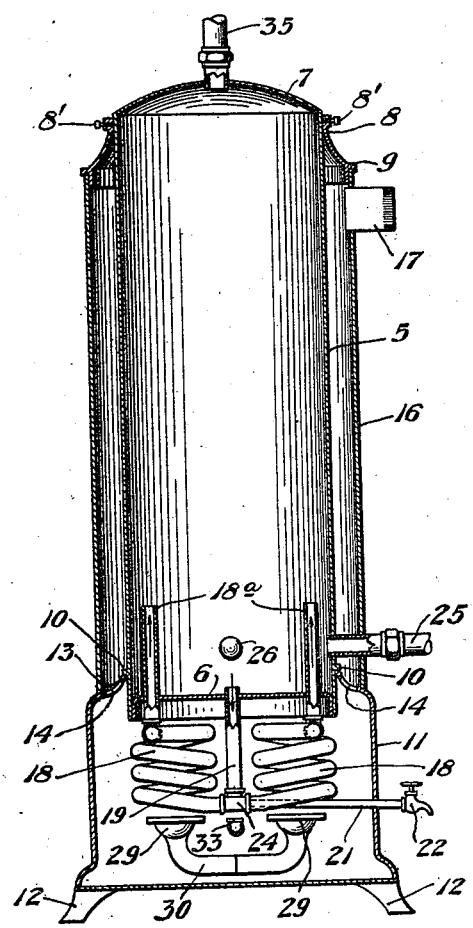
Figure 1 is a vertical section through a heater embodying my invention.
Figure 2:
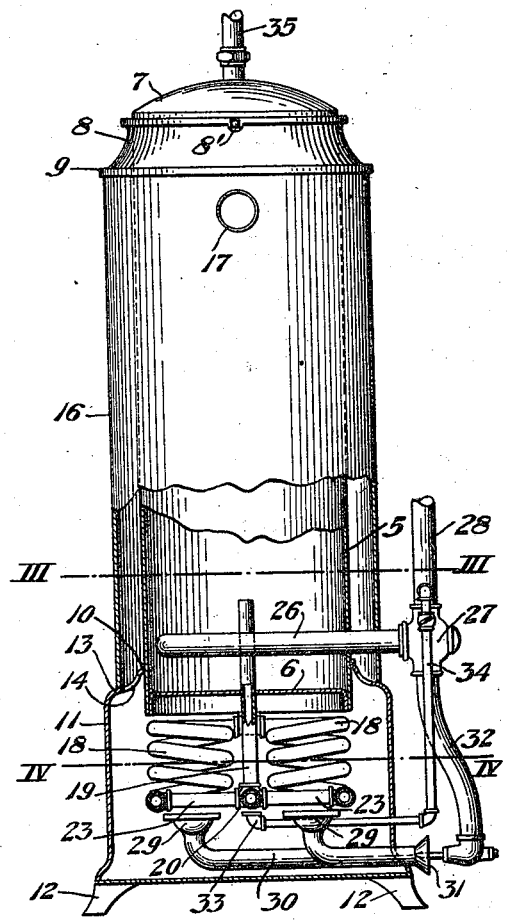
Figure 2 is a view partly in section and partly in elevation at right angles to Figure 1.
Figure 3:
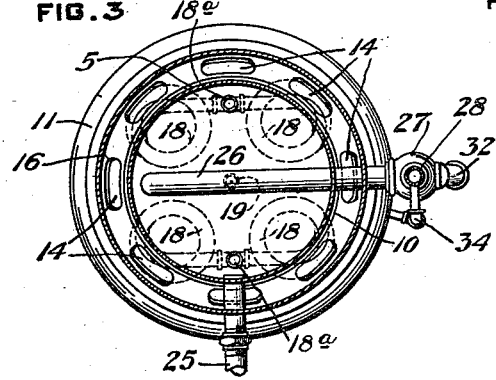
Figure 3 is a horizontal section on line III—III of Figure 2.

In the drawings, 5 indicates a tank having a bottom 6, and a top 7. Surrounding the upper part of the tank is a metal ring 8, having set screws or bolts 8' around the upper edge thereof, by means of which the ring may be clamped to the tank. The lower edge of the ring 8 has a flange and shoulder at 9. The tank is provided near its lower end with an annular bead or ring or with projecting lugs, indicated at 10. The tank is supported in a base 11, preferably formed of cast iron. The base 11 is carried on legs 12 and has a contracted portion 13, on which the ring or lugs 10 on the tank are adapted to rest, thus supporting the tank. The contracted portion 13 of the base forms an inwardly directed flange on which both the tank and an outer shell or casing are mounted. At 14 in the contracted portion of the base are holes or openings.

Disposed between the base and the flange and shoulder at 9 is a sheet metal shell or casing 16, having a flue leading therefrom at 17.

Figure 4:
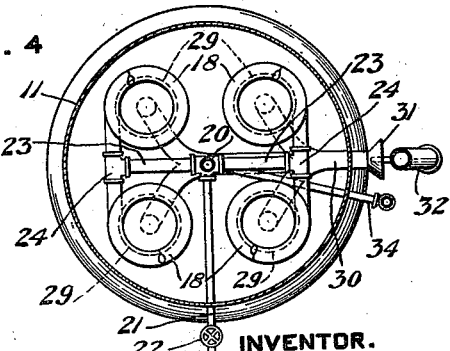
Figure 4 is a similar section on line IV—IV of Figure 2.

Within the base 11 and disposed under the tank 5, are one or more, preferably four, heating coils 18. Leading from the bottom of the tank is a vertical pipe 19. The lower end of this pipe is joined to a T, 20. A drain pipe 21, having a faucet 22 thereon leads from one branch of the T, and serves to drain the tank and coils. From the other branches of the T are oppositely extending pipes 23, which are joined to T's 24. To the opposite branches of the Ts 24 are connected the lower ends of coils 18 (see Figure 4). I do not necessarily limit myself to this method of connecting all of the coils to a central downwardly extending pipe, as various other ways of connecting the lower ends of the coils to the bottom of the tank could be used. The upper ends of the coils 18 extend up through the bottom 6 of the tank and a considerable distance up into the tank, as indicated by 18$^a$.

A cold water supply pipe is indicated at 25. It preferably opens into the tank at a point between the bottom thereof and the tops 18$^a$ of the pipes which extend upwardly from the heating coils.

Projecting into the tank, preferably at the same level as the cold water inlet, is a thermostat 26, of any suitable design. This thermostat controls a valve 27 in a gas or other suitable fuel pipe 28.

Disposed beneath the coils 18 are burners 29 on pipe 30. At 31 is a mixing valve, supplied through pipe 32, which is connected with the fuel supply pipe 28 through the thermo-valve 27. At 33 is a small burner connected through pipe 34 with the fuel supply pipe 28. The thermovalve does not control the flow of fuel to the small burner, which is arranged to burn continuously and provide a pilot light for the main burners 29. The burners 29 may be of any suitable number and construction, but I prefer to provide a separate burner under each coil 18.

The hot water is withdrawn from the tank 5 by a suitable pipe, such as 35, leading from the top 7 thereof.

In use, the tank is filled with cold water from the pipe 25. The thermostat 26 opens valve 27, and gas or other fuel is supplied to burners 29, and is lighted from pilot light 33. The water in the coils is heated, and it rises through pipes 18$^a$ and empties into the tank while other water flows down the central pipe 19. The arrows in Figure 1 indicate the direction of flow. The hottest water will of course always rise to the top of the tank, so that the thermostat, being near the bottom and near the cold water inlet is always in the coolest water in the tank. The thermostat will, therefore, maintain the valve 27 open until all the water in the tank will be sufficiently hot, when it will effect the actuation of valve 27 to close it. During the time the burners 29 are lighted, the hot gases pass up through openings 14 and around the tank between the tank and the shell 16. They can pass out the flue 17. Thus a saving of some of the heat is effected.

After the valve 27 has been closed, the pilot light 33 will continue to burn, keeping the water in the tank in circulation to a very slight extent and the heat that is not absorbed passes around the outside of the tank, thereby helping to prevent loss of heat from the tank. When the water in the tank cools, or hot water is withdrawn and replaced by cold water, the thermostat 26 will open valve 27.

By this arrangement, a relatively large body of water can be rapidly heated and then maintained at the desired heat, and frequent manual regulation of the burners is unnecessary. While it is not contemplated that the burners heat the water to the desired temperature at the same rate it is used, yet it does not take long to heat a tank full after all the hot water has been exhausted. It is important that the pipes 18$^a$ do not extend too far up into the tank, as otherwise partially heated water might be directed into the upper part of the tank where the hottest water has accumulated.

Various changes and modifications may be made in the construction of the heater as shown and within the contemplation of the appended claim.

What I claim is:

A water heater comprising a base having a contracted upper end portion forming an inwardly directed flange in which are perforations, a tank having its lower end mounted in the contracted upper end of the base and provided with projecting supporting means seated upon the said flange at the inner sides of the perforations, a shell supported on the flange at the outer sides of the perforations and spaced from the tank whereby gases may pass through the perforations of the flange of the base into the space between the tank and the shell, a heating coil communicating with the tank within the base and close to the bottom of the tank, and a burner in the base below the heating coil.

In testimony whereof I affix my signature.

ROBERT J. BELER.